July 6, 1965
A. F. SILVA ETAL
3,192,687
METHOD AND APPARATUS FOR PROCESSING A NATURAL GAS STREAM
Filed June 26, 1962
5 Sheets-Sheet 3
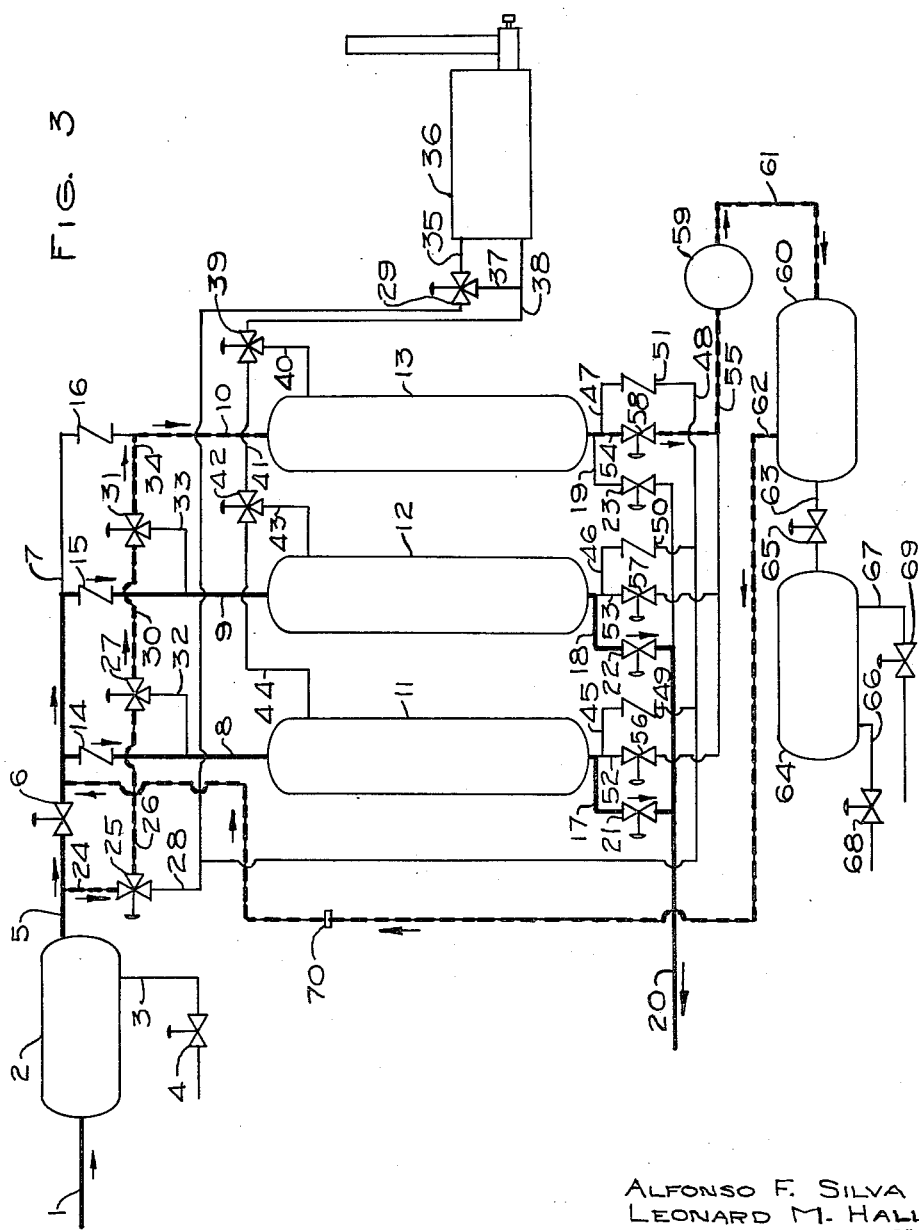
ALFONSO F. SILVA &
LEONARD M. HALL
INVENTORS
BY *Jack R. Springate*
ATTORNEY

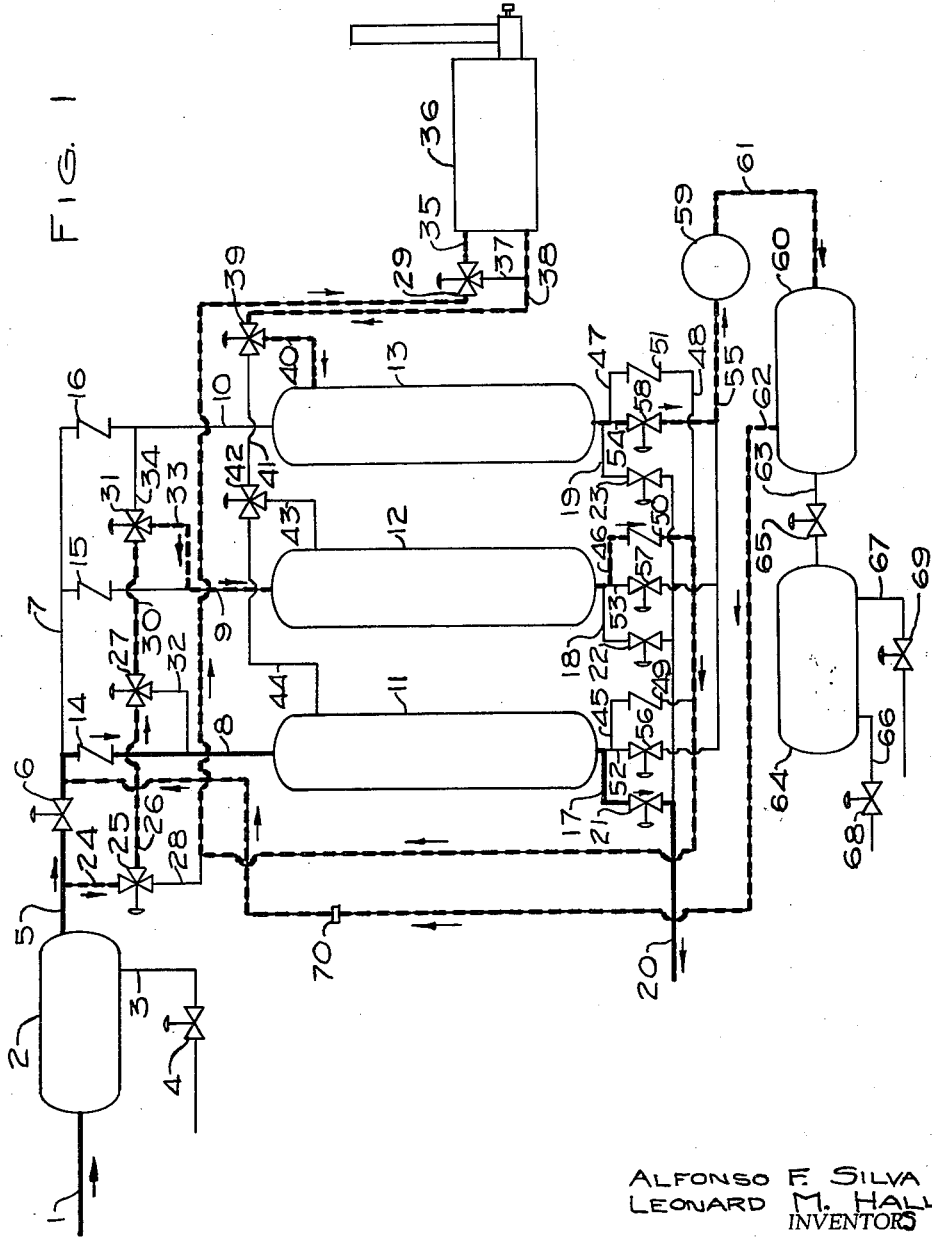

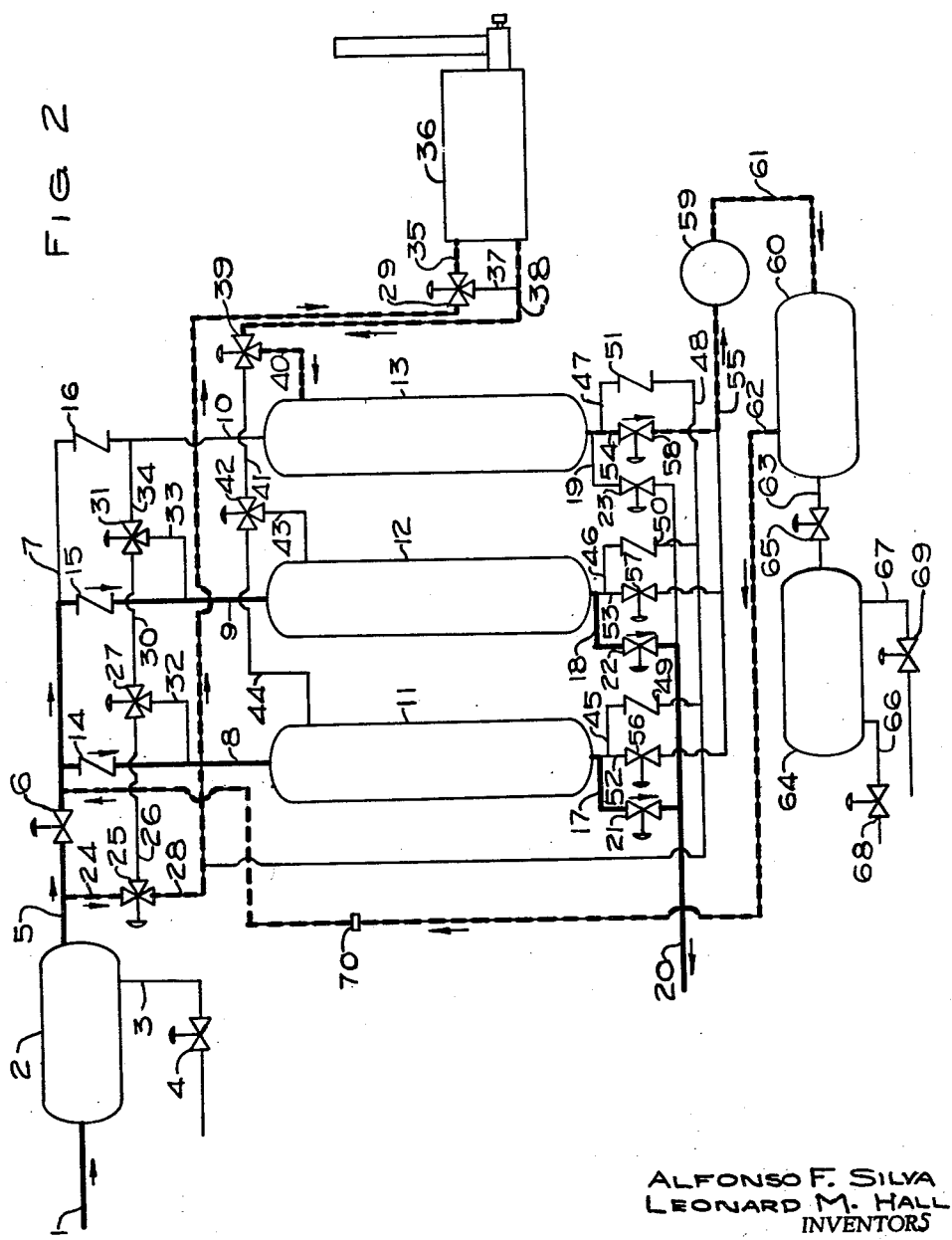

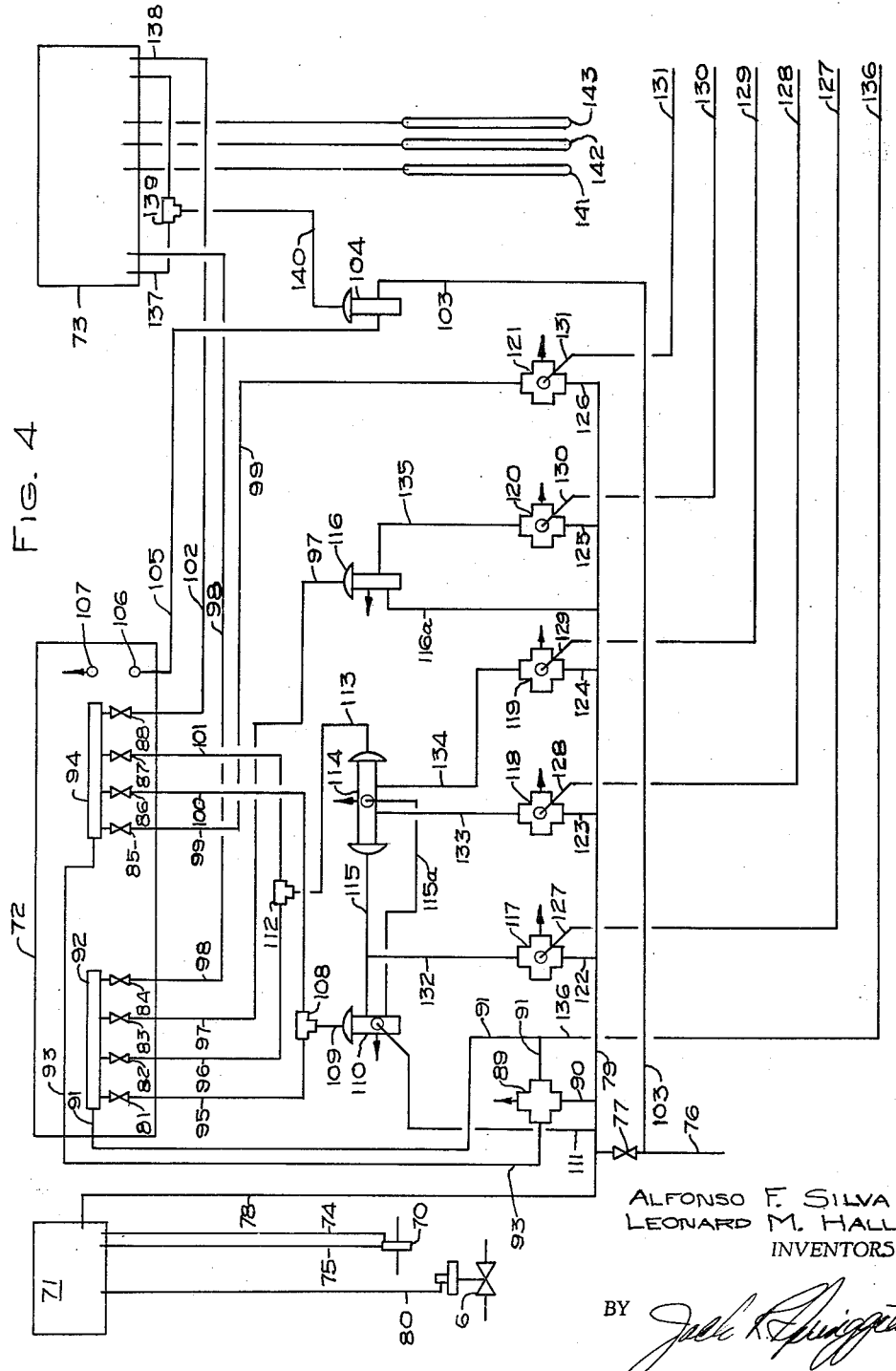

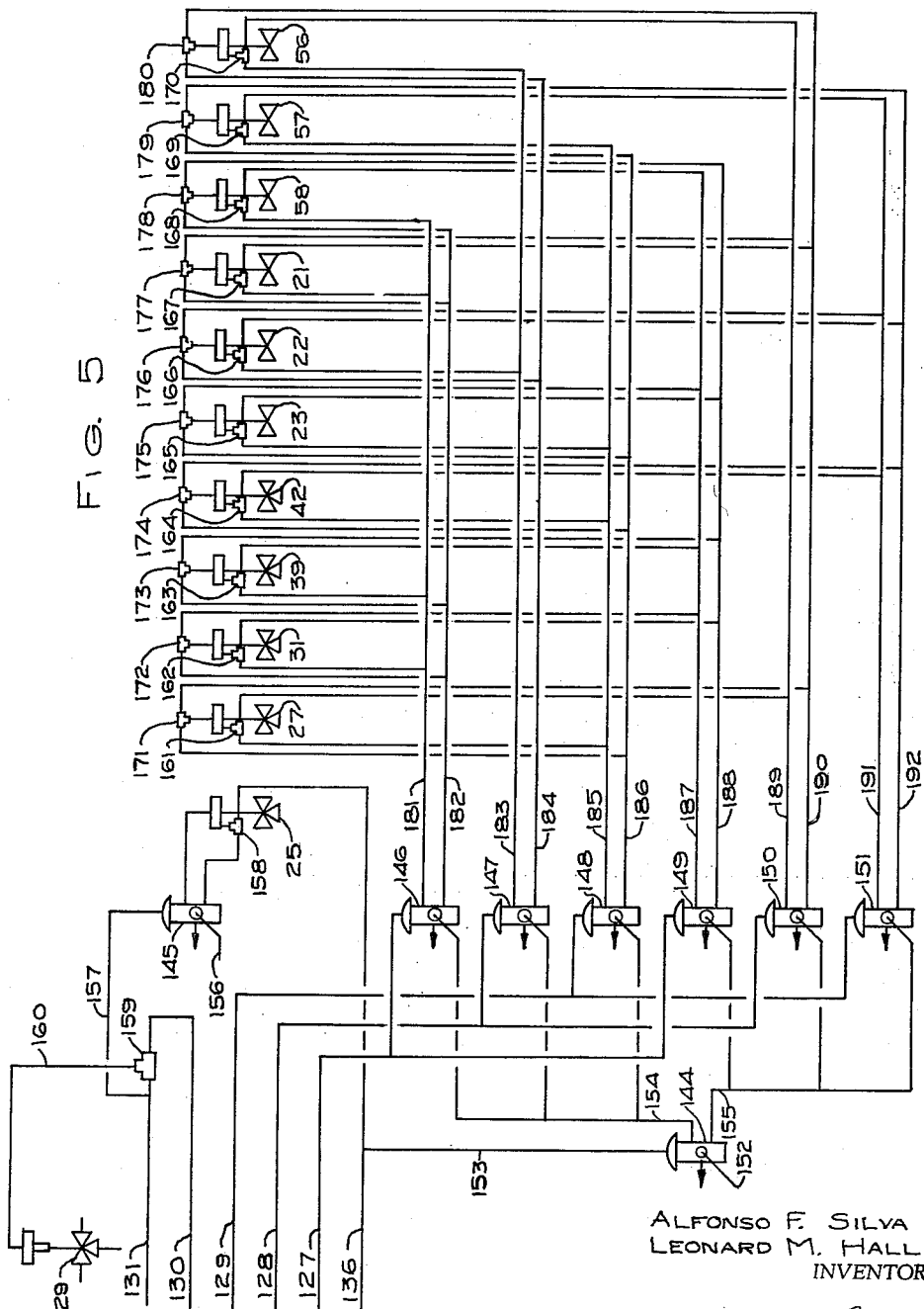

United States Patent Office 3,192,687
Patented July 6, 1965

3,192,687
METHOD AND APPARATUS FOR PROCESSING A NATURAL GAS STREAM
Alfonso F. Silva and Leonard M. Hall, Oklahoma City, Okla., assignors to Black, Sivalls & Bryson, Inc., Kansas City, Mo., a corporation of Delaware
Filed June 26, 1962, Ser. No. 205,328
5 Claims. (Cl. 55—33)

The present invention relates generally to a process for the removal of liquifiable constituents from a gaseous stream. More particularly, the present invention relates to a process and an apparatus for the removal of recoverable hydrocarbons from a natural gas stream and for the removal of water and water vapor from such natural gas stream.

In the past, natural gas streams have been processed in many ways for the removal of water and water vapor and for the removal and recovery of the desirable heavier hydrocarbons. It is well known that certain adsorbent materials may be used for the removal of water and water vapor and for the recovery of the desirable heavier hydrocarbons from a natural gas stream. The same adsorbent materials generally are utilized for both the process of removing the hydrocarbons and the process of removing the water and water vapor. The basic difference in these two processes is the time during which the gas stream being processed is allowed to flow through the adsorbent material. Since most such adsorbent materials will have a preferential affinity for adsorbing the water as compared to the hydrocarbons and a preferential affinity for adsorbing the heavier hydrocarbons as compared to the lighter hydrocarbons, it is desirable that the stream being processed for water and water vapor removal be allowed to flow through the adsorbent material until substantially the entire bed of the adsorbent material has been saturated with the adsorbed water and the previously adsorbed hydrocarbons have been displaced by the water. If it is desired that the process remove and recover the hydrocarbons, then the gas stream should be allowed to flow through the adsorbent material only until the adsorbent material is saturated with the lightest of the hydrocarbons which are to be removed from the gas stream.

Both types of processes require that the adsorbent material, once it has been saturated with either the lightest of the hydrocarbons or with the water, be regenerated. This regeneration is accomplished in the majority of instances by flowing a hot relatively dry gas stream through the saturated adsorbent material to cause the adsorbed components of the gas stream to be vaporized and carried away from the adsorbent material whereby the adsorbent material is prepared for again receiving the flow of the gas stream being processed. Generally in the regeneration of the adsorbent material, the material is first heated with a relatively hot, dry gas stream and is then cooled so that it will be ready to adsorb from the gas stream being processed. The regeneration gas stream is generally cooled after passing through the adsorbent material to condense the components which have been vaporized from the adsorbent material. These condensed liquids are usually separated from the regeneration gas stream and the regeneration gas stream is either recycled to a heat source or otherwise utilized or returned to the main gas stream.

In such systems, the size of the vessels containing the adsorbent material and the amount of adsorbent material has to be determined in accordance with the size of the main gas stream being processed and the composition of the main gas stream. Such systems are controlled by a timing mechanism or some suitable sensing device so that while at least one of the vessels is processing the main gas stream, the other or others are being regenerated. The vessels have to be sized to be sufficiently large to prevent excess flow velocities within the vessel and also of sufficient size to contain the amount of adsorbent material which is necessary to accomplish the desired removal from the main gas stream. A vessel which is designed to remove only water vapor by adsorption will require the same vessel size as the vessel for hydrocarbon recovery considering only the rate of flow of the stream being processed. However, additional factors affecting the vessel size have to be considered in each type of process. In a hydrocarbon recovery process, the amount of adsorbent material and the time during which the stream is conducted through the adsorbent material will be determined in part by the lightest of the hydrocarbons which is to be recovered. If there is not sufficient adsorbent material or if the gas stream is conducted through the adsorbent material for too long a period of time, the lightest of the hydrocarbons which is to be recovered will be at least partially displaced from the adsorbent material and will be discharged from the adsorbent bed with the gas stream flowing from the adsorbent bed. In a dehydration system, the velocity of flow through the vessel is determined in the same manner but the amount of the adsorbent material and the time during which each adsorbent bed is to be receiving the gas stream will be determined by the water content of the gas stream and the degree of dryness which is desired from the gas stream.

The consumption of natural gas has been increased in recent years. One major problem associated with the transportation and sale of natural gas has been the seasonal variations in the consumption of the natural gas. During the three cold weather months, many times the demand for the natural gas will be at least twice what it is during the remaining months of the year. This is a natural result of the substantial use of natural gas for heating. Since there is this substantial variation in the demand it is desirable that there should be a flexibility in the design capacity of equipment which is processing a natural gas stream to allow the stream to be processed adequately during either the peak demand months or during the remaining months of the year. Therefore it is the primary object of the present invention to provide an apparatus and a method of processing a natural gas stream having sufficient flexibility to have capacity for the varying flow rates of the natural gas stream during peaks and lulls in the demand.

Another object of the present invention is to provide a method and an apparatus for recovering hydrocarbons from a natural gas stream at flow rates substantially above normal flow rates. Still another object of the present invention is to provide a method and an apparatus to dehydrate a natural gas stream and for the recovery of desirable hydrocarbons from the natural gas streams at times when the flow rates of the natural gas stream are substantially reduced. A further object of the present invention is to provide a method and an apparatus for processing a natural gas stream at flow rates which vary substantially while utilizing at all times a substantial portion of the capacity of the equipment. A still further object of the present invention is to provide a control system for the combined processes of the present invention which will allow switching from one type of process to the other.

These and other objects of the present invention are hereinafter more fully explained in reference to the drawings wherein:

FIG. 1 is a schematic flow diagram of the process of the present invention illustrating its operation under normal flow rates.

FIGS. 2 and 3 are the same schematic flow diagram as shown in FIG. 1 but illustrates the operation of the process under substantially increased flow rates.

FIG. 4 is a partial schematic diagram of the control instrumentation of the present invention.

FIG. 5 is a partial schematic diagram of the remainder of the control instrumentation of the present invention which is not shown in FIG. 4.

Referring more in detail to the drawing:

In FIGS. 1, 2 and 3 the apparatus involved is identical and therefore will be described as to specific apparatus and then the operation of the processes as shown in FIGS. 1, 2 and 3 will be described and in such description of the operation of the processes will the differences in the figures be explained. In the figures, the main gas stream being processed is shown as a solid heavy line and the regeneration gas stream including the cooling stream is shown as a heavy dotted line. In FIGS. 4 and 5 the parts which are also illustrated in FIGS. 1, 2 and 3 are provided with the same number for identification so that the control system of FIGS. 4 and 5 will be more easily understood with respect to the process illustrated in FIGS. 1, 2 and 3.

The main gas stream to be processed is conducted through line 1 into inlet separator 2. Within inlet separator 2 the liquids flowing in the main gas stream are separated from the gas and the separated liquids are discharged from inlet separator 2 through liquid outlet 3 under suitable control such as valve 4 which may be responsive to the level of liquids within inlet separator 2. The main gas stream free of liquids is discharged from inlet separator 2 through gas outlet 5. Gas outlet 5 connects through pressure reducing valve 6 into main stream header 7. Lines 8, 9 and 10 connect from header 7 into sorbers 11, 12 and 13 respectively. Check valves 14, 15 and 16 are in lines 8, 9 and 10 respectively to allow the flow of gas from header 7 toward sorbers 11, 12 and 13 only. Lines 17, 18 and 19 extend from sorbers 11, 12 and 13 to outlet gas header 20. Valves 21, 22 and 23 are positioned in lines 17, 18 and 19 respectively to control the flow of gas therethrough.

Line 24 connects into line 5 as a point between inlet separator 2 and pressure reducing valve 6 into valve 25. Line 26 connects from valve 25 into valve 27 and line 28 connects from valve 25 into heater by-pass valve 29. Line 30 connects from valve 27 into valve 31 and line 32 connects from valve 27 into line 8 at a point between check valve 14 and sorber 11. Line 33 connects from valve 31 into line 9 at a point between check valve 15 and sorber 12 and line 34 connects from valve 31 into line 10 at a point between check valve 16 and sorber 13.

Line 35 connects from heater by-pass valve 29 into heater 36 and line 37 connects from heater by-pass valve 29 to heater outlet line 38 which connects from heater 36 to valve 39. Line 40 connects from valve 39 into sorber 13 and line 41 connects from valve 39 to valve 42. Line 43 connects from valve 42 into sorber 12 and line 44 connects from valve 42 into sorber 11.

Lines 45, 46 and 47 extend from sorbers 11, 12 and 13 respectively and are all connected into cooling gas header 48 which is connected into line 28 as shown. Check valves 49, 50 and 51 are positioned in lines 45, 46 and 47 respectively. Lines 52, 53 and 54 connect from sorbers 11, 12 and 13 respectively into regeneration gas header 55 and are controlled by valves 56, 57 and 58 respectively. Regeneration gas header 55 extends to air cooler 59 which is connected to regeneration separator 60 by line 61. Gas outlet 62 from regeneration separator 60 connects into main stream header 7 at a point just downstream of pressure reducing valve 6. Liquid outlet 63 from regeneration separator 60 connects into liquid separator 64 and valve 65 is positioned in liquid outlet 63. Liquid separator 64 is provided with outlets 66 and 67 which are controlled by valve 68 and 69 respectively. Flow sensing device 70 is positioned in gas outlet 62 and is connected to pressure reducing valve 6 to control the pressure reduction which will control the flow of gas through the regeneration gas system as hereinafter more fully explained.

The pneumatic control system as illustrated in FIGS. 4 and 5 includes recording flow controller 71, cycle programmer 72 and temperature recorder and safety control 73. Static pressure and differential pressure are transmitted to flow controller 71 through lines 74 and 75 from flow sensing device 70. Supply gas is provided to the pneumatic control system through line 76. Pressure regulator 77 reduces the pressure of the supply gas and connects to flow controller 71 through line 78 and to supply gas header 79. Flow controller 71 will record the flow through flow sensing device 70 and will emit a pneumatic signal through line 80 to valve 6 to properly position valve 6 to provide the desired flow of gas through the regeneration system of the present invention as sensed by flow sensing device 70.

Cycle programmer 72 is provided with a pneumatic motor (not shown) which drives a plurality of cams (not shown). Valves 81 through 88 are provided with cam followers (not shown) which control the opening and closing of valves 81 through 88 when actuated by the cams. Switch selector 89 is a manually operated valve having four ports. One port is connected by line 90 to supply gas manifold 79. A second port is vented to the atmosphere as indicated by the arrow. A third port connects through line 91 into manifold 92 of cycle programmer 72. The fourth port connects through line 93 into manifold 94 of cycle programmer 72. Valves 81 through 84 connect from manifold 92 to lines 95 through 98 respectively. Valves 85 through 88 connect from manifold 94 to lines 99 through 102 respectively. Line 103 connects from line 76 to two-way pneumatic relay valve 104. Line 105 connects from valve 104 to inlet 106 to the pneumatic motor of cycle programmer 72. Outlet 107 is provided to exhaust the gas from the pneumatic motor.

Lines 95 and 100 connect into opposite ports of three-way ball check valve 108. Line 109 extends from the other port of check valve 108 to the actuator of four-way pneumatic relay valve 110. Valve 110 has a vent port as indicated by the arrow and is connected by line 111 from its common port to supply gas manifold 79. Lines 96 and 101 connect into opposite ports of three-way ball check valve 112. Line 113 extends from the other port of check valve 112 to one of the actuators of four-way pneumatic relay valve 114. The other actuator of valve 114 is connected by line 115 into relay valve 110. Line 115a connects from relay valve 110 to the common port of relay valve 114. Line 97 connects to the actuator of three-way pneumatic relay valve 116. Line 116a connects from supply gas manifold 79 into relay valve 116. Line 98 connects into safety control 73. Line 102 also connects into safety control 73. Switch selectors 117 through 121 are connected to supply gas manifold 79 by lines 122 through 126 respectively. Line 99 connects into switch selector 121 as shown. Each of switch selectors 117 through 121 are provided with a vent as indicated by the arrows. These switch selectors are also provided with control ports and common ports. Switch selectors 117 through 121 are provided with three positions. These positions are designated as "manual," "off" and "automatic." In the "off" position the common port is open to vent. In the "manual" position the common port is open to the supply gas manifold and in the "automatic" position the common port is open to the control port. Switch selectors 117 through 121 will generally be positioned in their "automatic" position to allow the switching to be controlled by cycle programmer 72. Lines 127 through 131 connect into the common ports of switch selectors 117 through 121.

Line 132 connects from the control port of switch selector 117 into line 115. Line 133 and 134 connects from the control ports of switch selectors 118 and 119 into relay valve 114 as shown. Line 135 connects from the control port of switch selector 120 into relay valve 116. Line 99 connects from valve 85 to the control port of switch selector 121. Line 136 connects into line 91 and is otherwise connected as hereinafter more fully explained with reference to FIG. 5.

Lines 137 and 138 extend from safety control 73 as shown and connect into opposite ports of three-way ball check valve 139. Line 140 connects from the other port of check valve 139 to the actuator of relay valve 104. Thermal sensing elements 141, 142 and 143 are positioned in sorbers 11, 12 and 13 respectively and are connected to temperature recorder and safety control 73. Thermal sensing elements 141, 142 and 143 are connected so that they will make a connection between lines 98 and 137 and between lines 102 and 138 when any one of thermal sensing elements 141, 142 or 143 is indicating a temperature higher than the temperature at which it is safe to switch the flow of gas into different sorbers.

In FIG. 5 four-way pneumatic relay valves 144 through 151 are each provided with a port for venting as indicated by the arrows, a common port and two additional ports as shown which alternately connect to the common port and to the vent. Each of relay valves 144 through 151 has a pneumatic actuator which controls the connections of the ports. Supply gas line 152 connects into the common port of relay valve 144 and though not shown would be preferably connected to supply gas manifold 79. Branch 153 connects from line 136 into actuator of relay valve 144. aMnifold 154 connects from one of the ports of relay valve 144 into the common port of relay valves 146, 147 and 148. Manifold 155 connects from the other port of relay valve 144 to the common ports of relay valves 149, 150 and 151.

Supply gas line 156 connects into the common port of relay valve 145 and though not shown would preferably be connected to supply gas manifold 79. Branch 157 connects from line 131 to the actuator of relay valve 145. One of the outlet ports of relay valve 145 connects to the upper side of the actuator of valve 25. The other outlet port of relay valve 145 connects into three-way ball check valve 158. Check valve 158 connects into line 136 and also connects into the lower side of the actuator of valve 25. Line 131 connects into three-way ball check valve 159 at a point past its connection to branch 157. Line 130 also connects into check valve 159. Line 160 extends from the other connection of check valve 159 to the actuator of heater by-pass valve 29.

Line 127 connects into the actuators of relay valves 146 and 149. Line 128 connects into the actuators of relay valves 147 and 150 and line 129 connects into the actuators of relay valves 148 and 151.

As shown in FIG. 5 each of valves 27, 31, 39, 42, 23, 22, 21, 58, 57 and 56 is provided with a lower three-way ball check valve 161 through 170 respectively and an upper three-way ball check valve 171 through 180. The lower check valves 161 through 170 are provided with a connection to the lower side of the actuators for the aforementioned valves and the upper check valves 171 through 180 are provided with a connection to the upper side of the actuators for the aforementioned valves. Also, connections are provided from check valves 161 through 180 to lines 181 through 192 extending from relay valves 146 through 151 as shown in FIG. 5.

When it is desired that the present invention process a natural gas stream to remove the desirable heavier hydrocarbons, such as the propanes and heavier, the invention will operate as best illustrated in FIG. 1. In operation, the main gas stream will flow through line 1 into inlet separator 2 where substantially all of the free and entrained liquids are removed from the gas stream. These liquids are discharged from inlet separator 2 through liquid outlet 3 under control of valve 4 and are conducted to a suitable apparatus for further processing such as a stage separator or a stabilizer (not shown). The gas which is discharged from inlet separator 2 through gas outlet 5 will be subtsantially free of all liquids and will be conducted through pressure reducing valve 6, main stream header 7, line 8 and check valve 14 into sorber 11. The interior of sorber 11 is filled with a suitable adsorbent material which will both adsorb the desired hydrocarbons and the water from the natural gas stream. While passing through sorber 11, the gas stream will be denuded of the desired hydrocarbons and water vapor and will be discharged through line 17 and valve 21 to outlet gas header 20. The gas flowing in outlet gas header 20 is conducted to suitable use or distribution which are not shown in the drawings and are not intended to be a part of the present invention.

During the time that sorber 11 is receiving the main gas stream for drying and removal of the desired hydrocarbons, sorber 12 will be in the stage of being cooled after having been regenerated and sorber 13 will be in the stage of being regenerated with hot regeneration gas. The regeneration gas stream is withdrawn from gas outlet 5 ahead of pressure reducing valve 6 and is conducted through line 24, valve 25, line 26, valve 27, line 30, valve 31, line 33 and line 9 into sorber 12. This gas stream being at the flowing temperature of the main gas stream will provide cooling for the adsorbent material within sorber 12 to prepare this adsorbent material for receiving the main gas stream when the adsorbent material within sorber 11 has been substantially saturated with the lightest of the hydrocarbons which is desired to be recovered by the process of the present invention. The gas stream flowing from sorber 12 is conducted through line 46, check valve 50, cooling gas header 48, line 28, heater by-pass valve 29 and line 35 into heater 36. The hot gas flows from heater 36 through line 38, valve 39, and line 40 into sorber 13. Valve 29 is actuated in response to the temperature of the gas flowing out of sorber 13 and when this gas reaches a preset temperature it will open line 37 to cause the regeneration gas to by-pass heater 36. The hot regeneration gas will flow through sorber 13 through line 54, valve 58 into regeneration gas header 55. The regeneration gas is cooled in air cooler 59 to cause the vaporized components to condense. The regeneration gas is conducted to regeneration separator 60 where condensed components are separated from the regeneration gas stream and are discharged from regeneration separator 60 through liquid outlet 63 and valve 65 into liquid separator 64. Water is discharged from liquid separator 64 through liquid outlet 66 under control of valve 68 and the condensed hydrocarbons are discharged from liquid separator 64 through outlet 67 under control of valve 69. The regeneration gas stream flows from regeneration separator 60 through gas outlet 62 and into main stream header 7 at a point just downstream of pressure reducing valve 6. A suitable controller (not shown) should be provided to control the valves of the present process so that the main gas stream will be conducted into sorber 12 when sorber 11 has become substantially saturated with the hydrocarbons which are to be recovered and then switched to sorber 13 when sorber 12 is finished with its processing of the main gas stream. It is generally considered adequate to control the sequence of regeneration and cooling of the sorbers with a time cycle controller but for the purposes of the present invention any suitable type of controller may be used which will properly control the sequence of operations and may do so by actually sensing the condition of the adsorbent material in the individual sorbers or by any other suitable means. When it is desired to recover the hydrocarbons from a natural gas stream the operation of a process as illustrated in FIG. 1 is generally on what is termed "a short cycle." A typical time period for a short cycle operation would be fifteen minutes during which a sorber would be on stream adsorbing the components from the main gas stream.

The control systems of FIGS. 4 and 5 will function to provide the foregoing process flow by providing supply gas through lines 76, line 103, relay valve 104 and line 105 to inlet 106 to the pneumatic motor driving the control cams of cycle programmer 72. Also, switch selector 89 should be positioned either manually or automatically by sensing the flow of gas in the main gas stream to provide connection between line 90 and line 91 so that supply gas will be conducted into manifold 92. Switch selectors 117 through 121 should be positioned on "automatic" to provide connection between their common ports and lines 132, 133, 134, 135 and 99 respectively. With the cams rotating a supply of control gas pressure flow from manifold 92 through valve 81, line 95, check valve 108 and line 109 into the actuator of relay valve 110. The actuation of relay valve 110 will provide a connection for supply gas from line 111 through relay valve 110 to line 115. The gas flowing in line 115 is conducted to the left hand actuator of relay valve 114 and also through line 132 and switch selector 117 into line 127. This position of relay valve 110 will also connect line 134 through line 115a to the vent of relay valve 110 and line 133 to the vent of relay valve 114.

The cams will also connect manifold 92 through valve 83, to line 97, thereby actuating relay valve 116 to provide a connection from supply gas manifold 79 through line 116a, line 135, switch selector 120, line 130, check valve 159 and line 160 to position heater by-pass valve 29 to close by-pass valve 37 and open the regeneration line into heater 36 through line 35. Near the end of each portion of the cycle supply gas pressure will be conducted from manifold 92 through valve 84 and line 98 into safety control 73. If the unit being regenerated has not reached the desired temperature as sensed by one of the temperature sensing elements 141, 142 or 143, then supply gas pressure will be connected through line 137 and check valve 139 to the actuator of relay valve 104. When actuated, relay valve 104 will shut, closing off the supply of gas to the pneumatic motor driving the cams of cycle programmer 72. This will cause the process to continue without change until a time when the temperature sensed by one of the temperature sensing elements 141, 142 or 143 reaches the predetermined level indicating that the sorber being regenerated is fully regenerated. At the time the pressure will be released from the actuator of relay valve 104 and supply gas will again be conducted to the pneumatic motor allowing the cycle to progress normally.

The supply gas pressure in line 136 will be exerted through check valve 158 on the under side of the actuator of valve 25 causing valve 25 to be positioned to conduct the flow as shown in FIG. 1. Valve 25 will remain in this position until switch selector 89 is changed at such time as it is desired to change the process to a preferential dehydration process rather than the combination dehydration and hydrocarbon recovery process which is illustrated in FIG. 1. Also, as long as switch selector 89 is positioned as described, supply gas pressure will be exerted through line 136 and branch 153 to the actuator of relay valve 144. In this position, supply gas pressure will be delivered through relay valve 144 and manifold 154 to the common ports of relay valves 146, 147 and 148. The supply gas pressure in line 127 will be conducted to the actuators of relay valves 146 and 149.

With supply gas pressure on the actuator of relay valve 146 the supply gas pressure from manifold 154 will be conducted through line 181 and the respective lower three-way check valves 162, 163, 167 and 168 to the lower side of the actuators of valves 31, 39, 21 and 58. At the same time, supply gas pressure from manifold 154 will be conducted through relay valves 147 to line 184 and through relay valve 148 to line 186. The supply gas pressure in line 184 will be conducted through the respective upper three-way check valve 176 and 180 to the upper side of the actuators of valves 22 and 56. The supply gas pressure in line 186 will be conducted through the respective upper three-way check valves 171, 174, 175 and 179 to the upper side of the actuators of valves 27, 42, 23 and 57. This will position all of the valves as shown in FIG. 1. Lines 182, 183, 185 and 187 through 192 will be connected to vent through relay valves 146 through 151 or relay valve 144.

At the end of the time period for the first portion of the cycle, assuming that sorber 13 has been fully regenerated, the cams will change position so that the supply gas pressure will be exhausted from line 95. This will cause relay valve 110 to vent line 115 and line 132 and connect supply gas pressure through line 115a to the common port of relay valve 114. With the supply gas pressure vented from both actuators of relay valve 114 supply gas pressure will be conducted through line 133 and switch selector 118 into line 128. The supply gas pressure in line 128 will be conducted to the actuators of relay valves 147 and 150. The supply gas pressure will be vented from the actuators of relay valves 146 and 149 through line 127, switch selector 117, lines 132 and 115 to the vent of relay valve 110. The actuation of relay valves 147 and 150 will cause supply gas pressure to be delivered from manifold 154 through relay valve 147 to line 183. Supply gas pressure will be conducted through line 183 and the respective lower three-way check valves 166 and 170 to the actuators of valves 22 and 56. Supply gas pressure will be conducted from manifold 154 through relay valve 146, line 182 and the respective upper three-way ball check valves 172, 173, 177 and 178 to the upper side of the actuators of valves 31, 39, 21 and 58. Supply gas pressure will also be conducted from manifold 154 through relay valve 148, line 186 and the respective upper three-way check valves 171, 174, 175 and 179 to the upper side of the actuators of valves 27, 42, 23, and 57. Lines 181, 184, 185 and 187 through 192 will be connected to vent through relay valves 146 through 151 or through relay valve 144. These valve positions will cause the main gas stream to be conducted to sorber 12, the cooling gas stream to sorber 13 and the hot regeneration gas stream to sorber 11.

At the end of the above described second portion of this cycle, supply gas pressure will be conducted from manifold 92 through valve 82, line 96, check valve 112 and line 113 to the right-hand actuator of relay valve 114. This will actuate relay valve 114 to provide a connection for the supply gas pressure from line 115a to line 134. Supply gas pressure will be vented from line 127, through switch selector 117, line 132 and to vent through relay valve 110. Also supply gas pressure will be vented from line 128 through switch selector 118 and line 134 to the vent of relay valve 114. The supply gas pressure from line 134 will be conducted through switch selector 119 and line 129 to the actuators of relay valves 148 and 151. Actuation of relay valve 148 will connect supply gas pressure from manifold 154 through line 185 and the respective lower three-way ball check valves 161, 164, 165 and 169 to the lower side of the actuators of valves 27, 42, 23 and 57. The venting of supply gas pressure from the actuators of relay valves 146 and 147 will cause supply gas pressure to be conducted to lines 182 and 184. Supply gas pressure in line 182 will flow through the respective upper three-way ball check valves 172, 173, 177 and 178 to the upper side of the actuators of valves 31, 39, 21 and 58. Supply gas pressure in line 184 will flow through the respective upper three-way ball check valves 176 and 180 to the upper side of the actuators of valves 22 and 56. Lines 181, 183 and 186 through 192 will be connected to vent through relay valves 146 through 151 or through relay valve 144. These valve positions will cause the main gas stream to be conducted to sorber 13, the cooling gas stream to sorber 11 and the hot regeneration gas stream to sorber 12.

Thus, the control system illustrated in FIGS. 4 and 5 will provide a complete and continuing sequence of shifting the main gas flow through sorbers 11, 12 and 13 and also provide the proper flow of cooling gas and hot regeneration gas through the sorbers which are not receiving the main gas stream. This is accomplished by selecting the proper cams for cycle programmer 72.

The operation of the present invention as shown in FIGS. 2 and 3 differs from the operation of the unit shown in FIG. 1 in that FIGS. 2 and 3 operation is primarily for the purpose of dehydrating the natural gas stream which is accomplished at the expense of efficiency of the hydrocarbon recovery. One of the important differences in the system of FIGS. 2 and 3 as compared with the system of FIG. 1 is that it will operate on a substantially longer time cycle. Therefore, it is necessary that a separate sequence controller (not shown) be provided for the control of the dehydration operation. Also, some device will have to be provided to sense the flow rates to switch from the hydrocarbon recovery sequence controller to the dehydration sequence controller when the flow rates increase to the point that the hydrocarbon recovery system will not process the entire stream. This switching from one sequence controller to the other may be a manual operation without departing from the spirit of the present invention.

In FIG. 2 the main gas stream flows into inlet separator 2 wherein substantially all of the liquids are removed from the gas stream and are discharged through liquid outlet 3 under control of valve 4. The gas is discharged from inlet separator 2 through gas outlet 5, pressure reducing valve 6, main gas header 7, lines 8 and 9 and check valves 14 and 15 into sorbers 11 and 12. After being dehydrated within sorbers 11 and 12, the gas is discharged therefrom through lines 17 and 18, and valves 21 and 22 into outlet gas header 20. The gas is then conducted to some suitable use or distribution (not shown).

The regeneration gas is withdrawn from gas outlet 5 ahead of pressure reducing valve 6 and is conducted through line 24, valve 25, line 28, valve 29 and line 35 into heater 36. Heater by-pass valve 29 serves the function of diverting the regeneration flow to by-pass heater 36 through line 37 when the gas leaving sorber 13, which is being heated, reaches a preset temperature. The heated regeneration gas flows from heater 36 through line 38, valve 39 and line 40 into sorber 13. The regeneration gas flows from sorber 13 through line 54, valve 58, regeneration gas header 55, air cooler 59 into regeneration separator 60. The water and hydrocarbons which were adsorbed by the adsorbent material within sorber 13 while drying the main gas stream are vaporized by the hot regeneration gas stream and carried into cooler 59 wherein a substantial portion of such water and hydrocarbons will be condsensed. This water and hydrocarbons will be removed from the regeneration gas stream in regeneration separator 60. The regeneration gas stream flows from regeneration separator 60 through gas outlet 62 and flow sensing device 70 and into main steam header 7.

The operation of FIG. 3 is substantially the same as the operation shown in FIG. 2 except that sorber 13 has been regenerated with the hot regeneration gas and is now being cooled. The main gas stream is flowing through sorbers 11 and 12 and is flowing from the system through outlet gas header 20. The regeneration gas stream is withdrawn from gas outlet 5 ahead of pressure reducing valve 6 and flows through line 24, valve 25, line 26, valve 27, line 30, valve 31, line 34 and line 10 into sorber 13. This gas stream will be heated by the hot adsorbent material within sorber 13 and will thereby cool the adsorbent material therein. The regeneration gas stream flows from sorber 13 through line 54, valve 58, regeneration gas header 55, cooler 59, and line 61 into regeneration gas separator. Any liquids in the regeneration gas stream will be separated therefrom in regeneration separator 60. The regeneration gas stream flows though gas outlet 62 and flow sensing device 70 into main stream header 7 at a joint just downstream of pressure reducing valve 6.

To achieve the process flow described above in reference to FIGS. 2 and 3, it is first necessary to change the position of switch selector 89 from that which was described with relation to the flow in FIG. 1 to a position which provides a connection through switch selector 89 from line 90 to line 93. This will also connect line 91 to vent. In this position, supply gas pressure will be conducted to manifold 94 and manifold 92 will be vented. Supply gas pressure will be delivered to the pneumatic motor as previously described through relay valve 104. Initially, cam valve 85 will open providing supply gas pressure from manifold 94 through line 99, switch selector 121, line 131 and branch 157 to the actuator of relay valve 145. Supply gas presure will also be conducted from line 131 through check valve 159 and line 160 to heater by-pass valve 29 to cause it to direct the regeneration gas flow through line 35 into heater 36. The actuation of relay valve 145 will connect supply gas pressure through relay valve 145 to upper side of the actuator of valve 25 and will exhaust the lower side of this actuator. In this position, valve 25 will conduct the flow of the regeneration gas as shown in FIG. 2.

Cam valve 86 will also be actuated providing supply gas pressure from manifold 94 through line 100, check valve 108 and line 109 to the actuator of relay valve 110. The actuation of relay valve 110 will conduct supply gas pressure from line 111 through line 115 to the left-hand actuator of relay valve 114 and will conduct supply gas pressure through line 132, switch selector 117 and line 127 to the actuators of relay valves 146 and 149. The venting of pressure from line 136 will vent the pressure from the actuator of relay valve 144 through branch 153. With its actuator vented relay valve 144 will provide supply gas pressure from line 152 to manifold 155 and will vent manifold 154. The supply gas pressure in manifold 155 is conducted to the common ports of relay valves 149, 150 and 151. With relay valve 149 actuated, the supply gas pressure from manifold 155 will be conducted through line 187 through the respective upper three-way check valves 172 and 175 to the upper part of the actuators of valves 31 and 23 and also through lower three-way check valves 163 and 168 to the lower side of the actuator of valves 39 and 58. Supply gas pressure also will be conducted from manifold 155 through relay valve 151, line 192 and the respective upper check valves 174 and 179 to the upper side of the actuators of valves 42 and 57 and through lower check valve 166 to the lower side of the actuator of valve 22. Lines 181 through 186, 188, 189 and 191 are vented through relay valves 146 through 151 or through relay valve 144.

With the valving in this position, the main gas stream will flow through sorbers 11 and 12 as shown in FIG. 2 and sorber 13 will be receiving hot regeneration gas. As soon as sufficient heating of sorber 13 has been accomplished, then valve 85 will vent line 99 which in turn will vent the actuators of valve 29 and relay valve 145. This will cause the supply gas pressure to be vented from the upper side of the actuator of valve 25 and supply gas pressure to be conducted through check valve 158 to the under side of the actuator of valve 25. The venting of valve 29 will cause it to open the flow to by-pass line 37. Valve 25 will be actuated to cause the flow of gas to be directly into sorber 13 for cooling.

Near the end of each portion of the cycle, supply gas pressure is provided through valve 88 from manifold 94 and line 102 into safety control 73. If the temperature conditions as sensed by the temperature sensing elements 141, 142 and 143 are proper, then the switch of sorbers hereinafter described will proceed. If the temperature conditions are not proper, then supply gas pressure will be conducted through line 138, check valve 139 and line 140 into the actuator of relay valve 104. This will shut off the flow of supply gas to the pneumatic motor and will have the effect of stopping the cams to retain the process in its existing operation until the temperatures have reached the proper point. Upon reaching the proper point, the supply gas pressure will be vented from the actuator of relay valve 104 and supply gas will again be delivered to the pneumatic motor allowing the cycle to proceed.

At the end of the above described portion of the cycle, line 99 will again receive supply gas pressure to change valve 25 and valve 29 into the position shown in FIG. 2. At this time, supply gas pressure will be exhausted from line 100 which will vent the actuator of relay valve 110. The venting of relay valve 110 will connect supply gas pressure from line 111 through line 115a into relay valve 114. This supply gas pressure will flow through relay valve 114, line 133, switch selector 118 and line 128 into the actuators of relay valves 147 and 150. Supply gas pressure will then be supplied through manifold 155 through relay valve 149 to line 188, through relay valve 150 to line 189 and through relay valve 151 to line 192. Supply gas pressure in line 188 will be conducted through lower check valves 162 and 165 to the under side of the actuators of valves 31 and 23 and through upper check valves 173 and 178 to the upper side of the actuators of valves 39 and 58. Supply gas pressure in line 189 will be conducted through lower check valves 161 and 170 to the lower side of the actuators of valves 27 and 56, through upper check valve 177 to the upper side of the actuator of valve 21. The supply gas pressure in line 192 will be conducted through upper check valves 174 and 179 to the upper side of the actuators of valves 42 and 57 and through lower check valve 166 to the lower side of the actuator of valve 22. Lines 181 through 187, 190 and 191 are vented. With the valves in this position, the main gas stream will flow through sorbers 12 and 13 and sorber 11 will be on regeneration. Heating of sorber 11 will continue until valves 25 and 29 are switched to provide cooling as previously explained.

At the end of the second portion of the cycle, cam valve 87 will connect supply gas pressure from manifold 94 through line 101, check valve 112 and line 113 to the right-hand actuator of relay valve 114. This actuation of relay valve 114 will cause the supply gas pressure from line 115a to flow through line 134, switch selector 119 and line 129 to the actuators of relay valves 148 and 151. The actuators of relay valves 146, 147, 149, and 150 will be vented. Supply gas pressure from manifold 155 will flow through relay valve 149 to line 188, through relay valve 150 to line 190 and through relay valve 151 to line 191. Lines 181 through 187, 189 and 192 will be connected to vent through relay valves 146 through 151 or through relay valve 144 to vent. Supply gas pressure in line 188 will be conducted through lower check valves 162 and 165 to the under side of the actuators of valves 31 and 23 and through upper check valves 173 and 178 to the upper side of the actuators of valves 39 and 58. Supply gas pressure will be conducted from line 190 through upper check valves 171 and 180 to the upper side of the actuators of valves 27 and 56 and through lower check valves 167 to the lower side of the actuator of valve 21. Supply gas pressure in line 191 will be conducted through lower check valves 164 and 169 to the lower side of the actuators of valves 42 and 57 and through upper check valve 176 to the upper side of the actuator of valve 22. With the valves in this position, the main gas stream will flow through sorbers 11 and 13 and sorber 12 will continue until it is adequately regenerated with the flow as shown in FIG. 2 and then the flow will be switched to cool sorber 12 as shown in FIG. 3.

The control system of the present invention allows for the switching from the process illustrated in FIG. 1 to the process illustrated in FIGS. 2 and 3 merely by actuating switch selector 89. As previously mentioned, this may be done manually or by sensing the volume of flow of the main gas stream whereby it will automatically switch to the process described with regard to FIGS. 2 and 3 when the flow reaches a predetermined amount. Caution should be used in such an automatic switching system to assure that the main gas stream is not switched into a sorber which is hot from regeneration.

A typical example of the wellstream where the present invention would be applied would be as follows:

Gas flow rate:
    Hydrocarbon recovery on short cycle
        m.s.c.f.d__ 40,000
    Dehydration and hydrocarbon recovery on
        short cycle _____m.s.c.f.d__ 60,000
    Dehydration and hydrocarbon recovery on
        long cycle _____m.s.c.f.d__ 120,000
Design pressure _____p.s.i.g__ 1,200
Inlet temperature _____° F__ 80
Ambient air temperature _____° F__ 95

The long cycle employs two towers drying while the other is being regenerated. Each tower will dehydrate 60,000 m.s.c.f.d. Each tower will be drying for one hour and each will be regenerated in 30 minutes. The short cycle employs one tower for drying, one for heating and one for cooling simultaneously. A regenerated tower switches to adsorbing every fifteen minutes.

The present invention provides a method of processing a natural gas stream and suitable equipment for such processing which can be adapted to recover the desired hydrocarbons from the natural gas stream at the low flow rates occasioned by the low demand for the natural gas by consumers during the warm months and will dehydrate the natural gas stream at the high flow rates occasioned by the high or peak demand for the natural gas by consumers during the cold months. This dual function is served by the present invention solely by relatively inexpensive modifications of a hdyrocarbon recovery system and by the addition of a controller to control the sequencing of the sorbers during dehydration.

In the process illustrated in FIG. 1 the main gas stream will be flowing through one of the sorbers while a second sorber will be receiving hot regeneration gas to remove the water and hydrocarbons adsorbed from the main gas stream and the third sorber will be receiving cool regeneration gas stream to cool the sorber and the adsorbent material therein to prepare it for adsorption of the water and hydrocarbons from the main gas stream. The sizing and timing of these cycles should be given careful consideration and adjusted so that the individual sorbers will be on their adsorption portion of the cycle long enough to efficiently adsorb the desired hydrocarbons, but not so long that it will allow the adsorption of the water to displace the adsorbed hydrocarbons. The process illustrated in FIGS. 2 and 3 will connect the main gas stream to two of the sorbers at one time thereby effectively increasing the capacity of the unit to handle the larger volumes of gas needed during periods of peak demand. This process will only remove the water and water vapor from the gas stream and will not allow any appreciable recovery of the desirable hydrocarbons but in many installations, the combined processes from an economic standpoint will be substantially more efficient than any individual process.

What we claim and desire to secure by Letters Patent is:

1. The improvement in the process of adsorbing components from a natural gas stream in which at least three adsorbent beds remove condensables from the stream and are simultaneously and continuously but alternately going through an adsorption cycle where the bed adsorbs and becomes saturated with the components, a heating cycle where the saturated bed is heated to dry the adsorbed components out of the saturated bed, and a cooling cycle where the heated bed is cooled in preparation for the next adsorption cycle comprising, when the flow of the natural gas stream is normal placing the first of said beds on the adsorption cycle, the second of said beds on the cooling cycle, and the third of said beds on the heating cycle, during the period when the flow of said natural gas stream is greater than normal placing two of said beds on the adsorption cycle while the third bed goes through the heating and cooling cycles.

2. The improvement in the process of recovering condensables from a natural gas stream in which at least three adsorbent beds remove condensables from the stream and are simultaneously and continuously going through cycles of and are connected to circuits of adsorption, heating, and cooling comprising, during the period of normal flow of said natural gas stream connecting one of said beds in the adsorption circuit, the second of said beds in the heating circuit, and the third of said beds in the cooling circuit, but when the flow of said natural gas stream becomes greater than normal connecting two of said beds in the adsorption circuit while the third bed is alternately connected into the heating and cooling circuits.

3. The improvement in the process of recovering condensables from a natural gas stream in which three adsorbent beds remove condensables from the stream and are simultaneously and continuously but alternately going through cycles of adsorption, heating, and cooling comprising, during the period of normal flow of said natural gas stream placing one of said beds in the adsorption cycle, the second of said beds in the heating cycle, and the third of said beds in the cooling cycle, when the flow of said natural gas stream is greater than normal placing two of said beds in the adsorption cycle while a third bed is alternately going through the heating and cooling cycles, the time of the cycles being the time necessary for the third bed to be processed through said heating and cooling cycles.

4. The improvement in the process of recovering condensables from a natural gas stream in which at least three adsorbent beds remove condensables from the stream and are simultaneously, continuously, and alternately going through cycles of adsorption, heating, and cooling comprising, during the period of normal flow of said natural gas stream placing one of said beds in the adsorption cycle, the second of said beds in the heating cycle, and the third of said beds in the cooling cycle, each of said cycles being of the same time duration, when the flow of said natural gas stream is greater than normal placing two of said beds in the adsorption cycle while the third bed is alternately placed in the heating and cooling cycles, the time period that the third bed is in the heating and cooling cycles is the same as during the period of normal flow, but the time the beds are in the adsorption cycle is twice the time the third bed takes going through the heating and cooling cycles.

5. An apparatus for the recovery of condensables from a natural gas stream comprising, three adsorbent beds, an adsorption circuit, a heating circuit including a heater, a condenser, and a separator, a cooling circuit including cooling means for cooling a hot bed, first control means being actuated during the period of normal flow of said natural gas stream for connecting one of said beds to the adsorption circuit, the second of said beds in the heating circuit, and the third of said beds in the cooling circuit, and second control means becoming actuated when the flow of said natural gas stream is greater than normal connecting two of said beds in the adsorption circuit and the third bed alternately in the heating and cooling circuits, the total time that the third bed is in the heating and cooling circuits being the same when the flow of said natural gas stream is greater than normal as during the period when the natural gas stream flow is normal.

References Cited by the Examiner

UNITED STATES PATENTS

| | | | |
|---|---|---|---|
| 2,629,460 | 2/53 | Maki | 55—62 XR |
| 2,665,769 | 1/54 | Walker et al. | 55—62 XR |
| 2,677,438 | 5/54 | Reid | 55—62 XR |
| 2,688,534 | 9/54 | Howard | 55—74 XR |
| 2,944,627 | 7/60 | Skarstrom | 55—33 |
| 3,030,798 | 4/62 | Lichtenfels | 55—18 XR |
| 3,055,157 | 9/62 | Lavery et al. | 55—163 XR |
| 3,062,038 | 11/62 | Ayers | 55—74 XR |
| 3,069,830 | 12/62 | Skarstrom et al. | 55—75 XR |
| 3,104,162 | 9/63 | Skarstrom | 55—75 XR |

OTHER REFERENCES

Hollicky, J. M.: "Processing of Natural Gas," Canadian Mining and Metallurgical Bulletin, vol. 51, No. 558, October 1958, pp. 630, 633.

Hull, R. J.: "New Gas Treater," Oil and Gas Journal, vol. 58, No. 1, Jan. 4, 1960, pp. 76–78.

REUBEN FRIEDMAN, *Primary Examiner.*